United States Patent [19]

Smith

[11] Patent Number: 5,543,961
[45] Date of Patent: Aug. 6, 1996

[54] FAR-INFRARED DIFFUSE REFLECTOR

[75] Inventor: Sheldon M. Smith, Los Gatos, Calif.

[73] Assignee: The United States of America as represented by the Administator of the National Aeronautics and Space Administration, Washington, D.C.

[21] Appl. No.: 74,513

[22] Filed: Jun. 10, 1993

[51] Int. Cl.$^6$ .................................................. G02B 5/02
[52] U.S. Cl. ............................ 359/350; 359/599; 428/687
[58] Field of Search .................................. 359/599, 350; 428/687

[56]  References Cited

U.S. PATENT DOCUMENTS

| | | |
|---|---|---|
| 2,275,602 | 3/1942 | Beck et al. ............................ 359/599 |
| 2,558,848 | 7/1951 | Harrison .............................. 359/599 |
| 3,669,867 | 6/1972 | Adachi . |
| 3,754,873 | 8/1973 | Bills et al. . |
| 4,114,983 | 9/1978 | Maffitt et al. ......................... 359/599 |
| 4,203,028 | 5/1980 | Brumann . |
| 4,427,265 | 1/1984 | Suzuki et al. ........................ 359/599 |
| 4,589,972 | 3/1986 | Pompea et al. . |
| 4,655,136 | 4/1987 | Reiss et al. . |

*Primary Examiner*—Martin Lerner
*Attorney, Agent, or Firm*—Kenneth L. Warsh; Guy Miller; John G. Mannix

[57] ABSTRACT

A diffuse reflector is provided which isotropically reflects the infrared and far-infrared regions of the spectrum. The reflector includes a metal plate having one surface that is roughened by an electric discharge machine so as to have an r.m.s. roughness large enough to diffusely reflect far-infrared radiation. The roughening process creates facets having cavities which trap and diffusely reflect normally incident far-infrared radiation. An example of a reflector so produced has an isotropic bidirectional reflectance distribution function approximately equal to $1/\pi$ sr$^{-1}$ between the wavelengths of 5 μm and 100 μm.

6 Claims, 4 Drawing Sheets

FAR-INFRARED DIFFUSE REFLECTOR

ORIGIN OF THE INVENTION

The invention described herein was made by an employee of the United States Government and may be manufactured and used by or for the government for governmental purposes without the payment of any royalties thereon or therefor.

FIELD OF THE INVENTION

This invention generally relates to an isotropically diffuse reflector of infrared and far-infrared radiation, to a method for making the same, and to use of the same as a calibration standard.

BACKGROUND OF THE INVENTION

The region of the electromagnetic spectrum between the wavelengths of 10 µm and 500 µm, generally known as the far-infrared, is largely unexplored. There are few detectors, and even fewer sources of bright radiation, in this region. Hence it is not surprising that there are no photometric calibration standards that work in the far infra-red. At visible wavelengths, opalescent glass functions as a calibration standard by diffusely transmitting the incident light equally in all directions, i.e. isotropically. This invention functions at far-infrared wavelengths by diffusely reflecting normally incident radiation equally in all directions. Further, the photometric value of that isotropic reflectance is constant between the wavelengths of 5 and 100 µm. Thus, the fact that the reflectance by this invention does not depend on either wavelength or the direction of reflection makes it a valuable photometric standard for the far-infrared, where, as noted, there are no existing standards. This invention may also be used as a standard in the infrared region of the spectrum.

For a surface to diffusely reflect very long wavelengths of far-infrared radiation in an efficient manner, the surface must be very rough, the features on it which are responsible for its roughness must be randomly oriented and uniformly distributed, and the surface must neither absorb nor transmit any of the incident radiation. It is a well known principle of optics that when the dimensions of an object or feature are about as large as the wavelength of the radiation involved, very significant diffraction or scattering effects occur. In particular, when the average size of a surface feature is larger than a wavelength of the incident radiation, the incident photons can "see" the random orientation of the individual features and can transfer that random distribution into the diffuse reflectance of the entire surface as a random distribution of reflected light rays. A random distribution of reflected light is the same in all directions, hence it is isotropic. Isotropic reflectance is considered to be perfectly diffuse because it has no enhancement or peak in the specular direction. Another term for perfectly diffuse or isotropic is Lambertian. In the absence of any absorption or transmission by a surface, its isotropic reflectance has a simply calculated value of $1/\pi$ sr$^{-1}$, and, as long as the wavelength remains smaller than the average size of a surface feature, that isotropic reflectance is independent of the value of the wavelength.

A surface that neither absorbs nor transmits any of the incident light, but reflects all of it, is considered to be a perfect reflector. At far-infrared wavelengths, most metals are perfect reflectors.

The average size of a surface facet is about twice the r.m.s. roughness, $\sigma$, of the surface, where $\sigma$ is defined as the root-mean-squared variation of surface height from the average height of the surface ($\sigma$ is approximately related to the arithmetic average roughness, Ra, by $\sigma \approx 1.11 \times$ Ra). Thus for wavelengths of radiation, $\lambda$, to be smaller than the individual facets of a randomly rough surface, the condition is $\lambda \leq 2\sigma$. A bidirectional reflectance distribution function (BRDF) to describe diffuse reflectance has been defined by F. E. Nicodemus and others (NBS Monograph #160, October 1977, U.S. Dept. of Commerce) as the bidirectional reflectance per unit projected detector solid angle. The value of the BRDF of an isotropic perfect reflector is $1/\pi$ sr$^{-1}$, and as noted above this value is independent of both the direction of reflection and the wavelength as long as $\lambda < 2\sigma$.

The directional reflectance actually measured by a detector with a projected detector solid angle of $\Omega_d \mathrm{Cos}\Theta_s$, is given in terms of the BRDF by $$R(\lambda,\Theta_s)=\mathrm{BRDF}(\lambda,\Theta_s)\Omega_d \mathrm{Cos}\Theta_s.$$

Here $\Theta_s$ indicates the angle reflection or scatter. If the reflecting surface is an isotropic perfect reflector, and $\lambda<2\sigma$, then the measured diffuse reflectance is $$R(\Theta_s)=(1/\pi)\Omega_d \mathrm{Cos}\Theta_s$$

the value of which is independent of wavelength and has only a very slight dependence on angle introduced by the obliqueness of the detector to the surface. Current theories of diffuse reflection (Beckman & Spizzichino, "The Scattering of Electromagnetic Waves from Rough Surfaces," Artech House Inc., Norwood Mass., 1987) indicate that although the direction reflectance is not isotropic at wavelengths longer than $2\sigma$, it will still be largely diffuse at wavelengths as long as $8\sigma$.

Diffuse reflectors for shorter wavelength radiation in the infrared region (from 0.8 µm to 10 µm) have been manufactured in a number of ways. Generally, diffuse reflectors are made by taking a reflective surface and roughening one of its faces. One method of manufacture involves sprinkling powders on a flat surface and gluing the powders to the surface. A second method involves grinding or blasting a metal or glass surface to achieve the necessary roughness for diffusely reflecting infrared wavelengths. A third method is to dimple an aluminum surface with a regular hexagonal array of approximately 1/64 inch (400 µm) diameter holes. These methods suffer from the ability to diffusely reflect far infrared wavelengths of 15 µm or longer.

The primary disadvantages of the above methods of roughening a reflective surface is that they either do not make the surface rough enough or they do not make the roughness random enough to enable the surface to function as an isotropic diffuse reflector for far-infrared wavelengths. If the surface is not rough enough (i.e., $\lambda$ is larger than $2\sigma$) the reflectance will not be perfectly diffuse and it will have an enhancement or peak in the specular direction which gets longer at longer wavelengths. If the roughness is non-random, the non-randomness will create diffraction effects which favor particular off-specular directions of reflection, thus making the diffuse reflectance non-isotropic.

Other general methods for roughening a surface include electric discharge machining (EDM). U.S. Pat. No. 3,754, 873 (Bills et al.) discloses a cold rolled sheet having a roughened surface formed by projections of such shape and arrangement that the visual appearance of the surface of the sheet is relatively constant. This sheet is disclosed as having an r.m.s. roughness $\sigma$ between 0.56 and 11.1 micrometers (Ra between 20 and 400 microinches). The steel sheet so produced is taken up on a coiler and there is no disclosure of the sheet being utilized for optical purposes, e.g., as a reflector for light at any wavelength.

U.S. Pat. No. 4,589,972 (Pompea et al.) discloses a coating which is optically black in the infrared region, i.e. one that absorbs the infrared part of the spectrum of light. This absorption is provided by the anodization and dyeing process, disclosed in U.S. Pat. No. 4,111,762, applied to a substrate that has a random series of "surface modifications" having an approximate width of about 100 microns and a depth of about 50 microns. The Pompea et al patent discloses that one method of creating such surface modifications is by an EDM process, but the patent does not suggest the use of such an EDM process for producing a reflective surface.

Other U.S. patents of general interest include 4,203,028 (Brumann); 4,655,136 (Reiss et al.); and 3,669,867 (Adachi) which disclose various methods of etching sheets.

SUMMARY OF THE INVENTION

According to one aspect of the invention, an infrared and far-infrared diffuse reflector is provided which is capable of isotropically reflecting normally incident infrared and far-infrared radiation. The diffuse reflector of the invention comprises a metal plate having a randomly roughened surface created by use of an electric discharge machine. Preferably, the surface so formed comprises a plurality of randomly oriented, randomly spaced facets and concave upward cavities and surfaces for trapping and diffusely reflecting normally incident infrared and far-infrared radiation. The roughened surface has r.m.s. roughness ($\sigma$) of about 56 micro-meters. The bidirectional reflectance distribution function (BRDF) of the reflection from this surface is approximately equal to $1/\pi$ $sr^{-1}$ and is not dependent on either reflection direction or wavelength.

In accordance with a second object of the invention, a method is provided for producing an infrared and far-infrared diffuse reflector wherein an electric discharge machine is used to roughen the surface of a metal plate in such a manner as to produce the infrared and far-infrared diffuse reflector.

In accordance with a third object of this invention, the isotropically diffuse reflector described above can be advantageously used as the inner, operative surface of an integrating sphere to diffuse a narrow collimated beam of infrared, far-infrared, or submillimeter radiation into an incident solid angle of nearly $2\pi sr$.

In accordance with a fourth object of this invention, the isotropically diffuse reflector described above can be advantageously used to attenuate the specular reflection from a surface by diffusing it isotropically into the reflected hemisphere.

In accordance with a fifth object of this invention, the diffuse reflector described above can be advantageously used as the inner, operative surface of an Lambertian black body source of infrared, far-infrared, or submillimeter radiation.

In accordance with a sixth object of this invention, the isotropically diffuse, perfect reflector described above can be advantageously used as a standard with which to photometrically calibrate measurements of unknown materials and surfaces in terms of the known BRDF reflectance of this surface regardless of the direction of reflection and regardless of the specific wavelength between the values of 5 $\mu$m and 100 $\mu$m.

Other features and advantages of the invention will be set forth in, or apparent from, the detailed description of preferred embodiments of the invention which follows.

DESCRIPTION OF THE PREFERRED EMBODIMENTS

Figure 1:
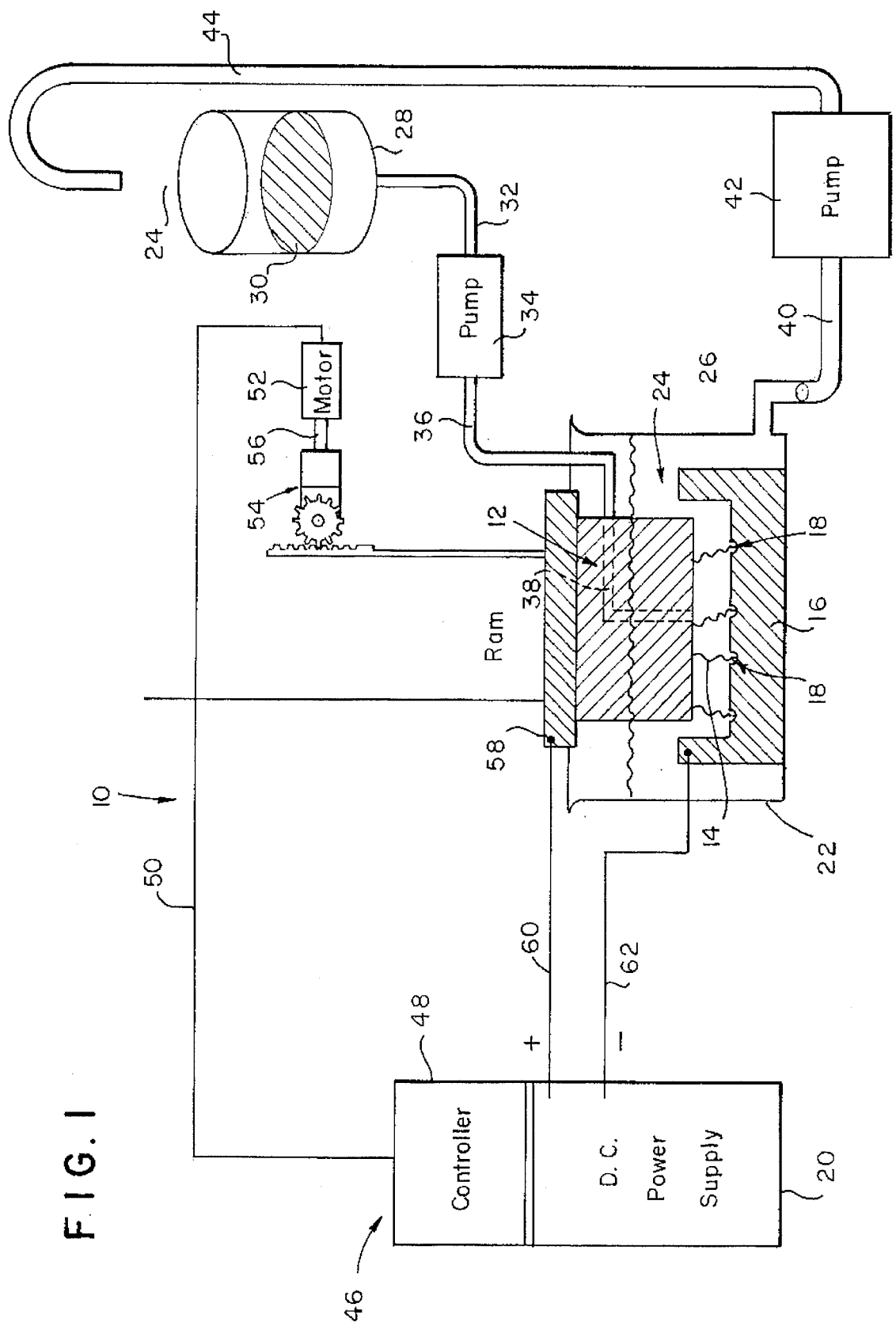
FIG. 1 is a schematic representation of an electric discharge machine, showing the manner in which depressions or cavities are created in the surface of a plate to produce a far-infrared diffuse reflector.

As discussed above, one aspect of this invention concerns the use of an EDM in producing a far-infrared diffuse reflector and thus the nature and operation of such a machine will first be considered, both in general and as used in accordance with the invention. Referring to FIG. 1, there is illustrated an EDM, generally denoted 10, which includes an electrode 12 that emits electric arcs 14 towards a plate 16. As the electric arcs 14 strike plate 16, the local surface of the plate 16 is heated up so as to vaporize the plate material directly therebelow, thus forming a facet, crater, or depression 18 therein. These facets 18 have an unusual shape (described later) and varying sizes, but are randomly spaced across plate 16. The EDM 10 is powered by a direct current (D.C.) power supply 20 which provides current to the electrode 12 at periodic intervals. To improve the electrical connectivity between the electrode 12 and plate 16, both the electrode 12 and plate 16 are placed inside of a container 22 which is filled with a dielectric material 24 such as oil. This dielectric material 24 not only aids in improving the connectivity but also provides for cooling of the surface of plate 16. The dielectric material 24 also assists in permitting the vaporized plate material to form small particles 26.

The dielectric material 24 is stored in a storage tank 28 which has a filter 30 for collecting particles 26. This storage tank 28 has an exit hose 32 attached thereto for allowing the dielectric material to enter a pump 34. Pump 34 forces the dielectric material 24 to enter hose 36 which in turn directs the dielectric material 24 into a channel 38 in electrode 12. Channel 38 enables the dielectric material 24 to enter container 22 while an exit orifice 40 allows the dielectric material 24 to leave container 22. The exit orifice 40 is in communication with a pump 42. Pump 42 and pump 34 are similar in nature and have the same flow rate, so that the level of dielectric material 24 in container 22 can be held constant. Pump 42 pushes the dielectric material through hose 44 which in turn deposits the dielectric material 24 in storage tank 28 where the material is filtered and then recycled as described above.

The gap between the electrode 12 and plate 16 is controlled by a vertical servo circuit 46. The circuit 46 has a controller 48 which provides an output signal 50 to a motor 52. Motor 52 provides power to a rack and pinion 54 via a drive shaft 56. The rack and pinion 54 adjusts the vertical displacement of the ram which is attached to a base 58 of electrode 12.

A voltage differential is generated between the electrode 12 and plate 16 by connecting the electrode base 58 to the positive terminal of power supply 20 by a connector or wire 60 and connecting the plate 16 to the negative terminal by a connector or wire 62. As stated above, the gap between electrode 12 and plate 16 is reduced by servo circuit 46 until the spacing is such that the dielectric material is ionized by the voltage that appears during the on-time of each current pulse. When the spacing is correct (about 0.001 to 0.005 inches), the oil ionizes and the ohmic resistance of the oil falls to a low level permitting an arc of current to pass from the electrode to the plate. The voltage difference discharges in randomly directed electric arcs 14 from electrode 12 to plate 16 which create facets, cavities, or depressions 18 in the surface of plate 16. These arcs strike across the shortest path available and move to a new location when an initial high spot has been eroded away. Thus, their direction is random and the facets that they create are randomly spaced across the length and width of plate 16.

Generally speaking, an EDM is conventionally used to remove large amounts of material from a sheet or plate, which is thereafter treated to produce a smoother (finer) surface. In accordance with this invention, an EDM is used to produce a very rough surface on a plate to provide the desired far-infrared reflectance characteristics, and no additional treating is used. To produce such roughness, with plate 16 in place, the EDM 10 is run in a mode that provides maximum material removal at a high discharge frequency, but for as short a time as is possible. Further, as noted, the EDM 10 is neither reset nor re-run to produce a smoother surface, as is present industry practice.

The operating parameters of the EDM are chosen to provide the desired current and energy per arc and in a preferred embodiment using the commercially available ELOX machine, an average current input of 15–20 amps is supplied to the machine. An average voltage of 66 volts is maintained by the EDM 10 which consumes an average power of 1155 Watts. The on-time of each current pulse is 0.5 millisecond, hence an average energy of 0.58 Joule is deposited by each current pulse. There are one thousand pulses delivered each second. With these settings, plate 16 is roughened to a $\sigma$ of about 56 micrometers and the reflector so produced (see FIGS. 2 and 3a–3c) will isotropically reflect wavelengths from 5 μm to at least 100 μm.

By roughening plate 16 in the manner described above, facets 18, holes 19, and depressions 21 are formed. Considering the nature of these features in more detail, the facets 18, formed in plate 16, resemble approximately round, hollow bubbles which often have a hole 19 near the top of the bubble. These holes 19 vary in size up to about 170 μm and lead to cavities having concave surfaces pointing generally upwards. The facets 18 and cavities so formed are ideal for both trapping and diffusely reflecting normally incident light of wavelengths smaller than the opening of the holes 19. Randomly interspersed between the facets are somewhat larger concave depressions 21 pointing generally upwards that are also well suited for diffusely reflecting normally incident far-infrared radiation. By adjusting the average operating current, the average power, the discharge frequency, and average energy in each pulse, the size of the facets 18 can be controlled so as to diffusely reflect more or less of the far-infrared spectrum.

Figure 2:
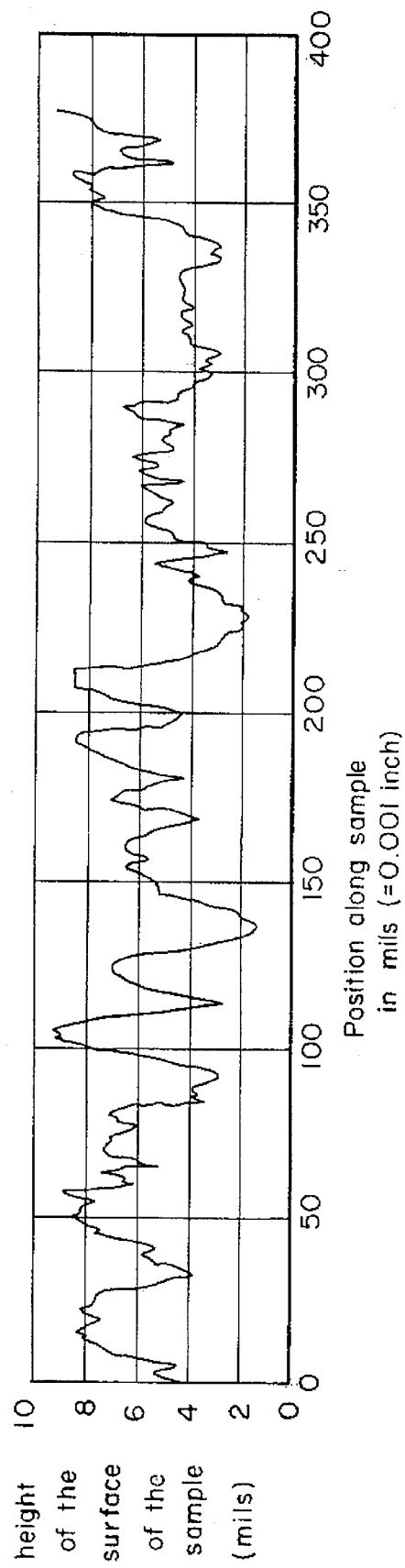
FIG. 2 is a graph of the surface height profile of a far-infrared diffuse reflector in accordance with an exemplary embodiment of the invention.
Figure 4:
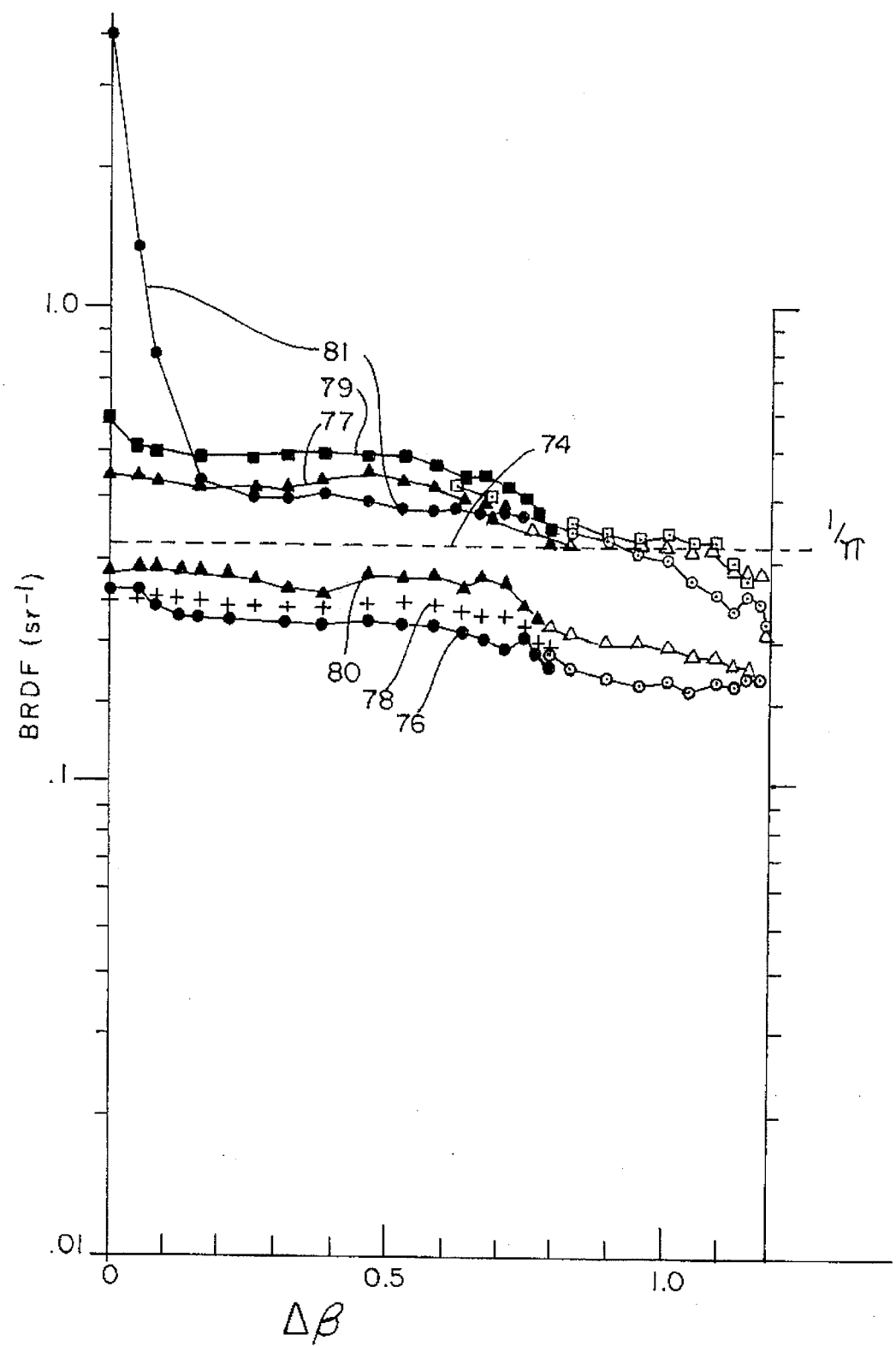
FIG. 4 is a graph on a logarithmic scale of the BRDF of an exemplary embodiment of the invention versus the projected off-specular angle, $\Delta\beta$.

As may be seen in FIG. 2, the surface created by the EDM process generates a randomly roughened surface. FIG. 4 is a trace made on a commercial profilometer and it illustrates the height of the surface on plate 16, i.e., shows the surface profile. As shown, the height of plate 16 varies from a maximum of approximately 9 mils (225 μm) to a minimum of approximately 1.8 mils (45 μm) from the base of plate 16. An r.m.s. roughness $\sigma$ of approximately 47 μm can be calculated from this tracing. It is noted that the cavities mentioned above are not clearly shown in FIG. 2 because the stylus of the profilometer used to make the profile measurements illustrated was too large to enter the openings of the cavities, although the several flat-topped peaks shown do indicate the presence of such cavities.

Figure 3:
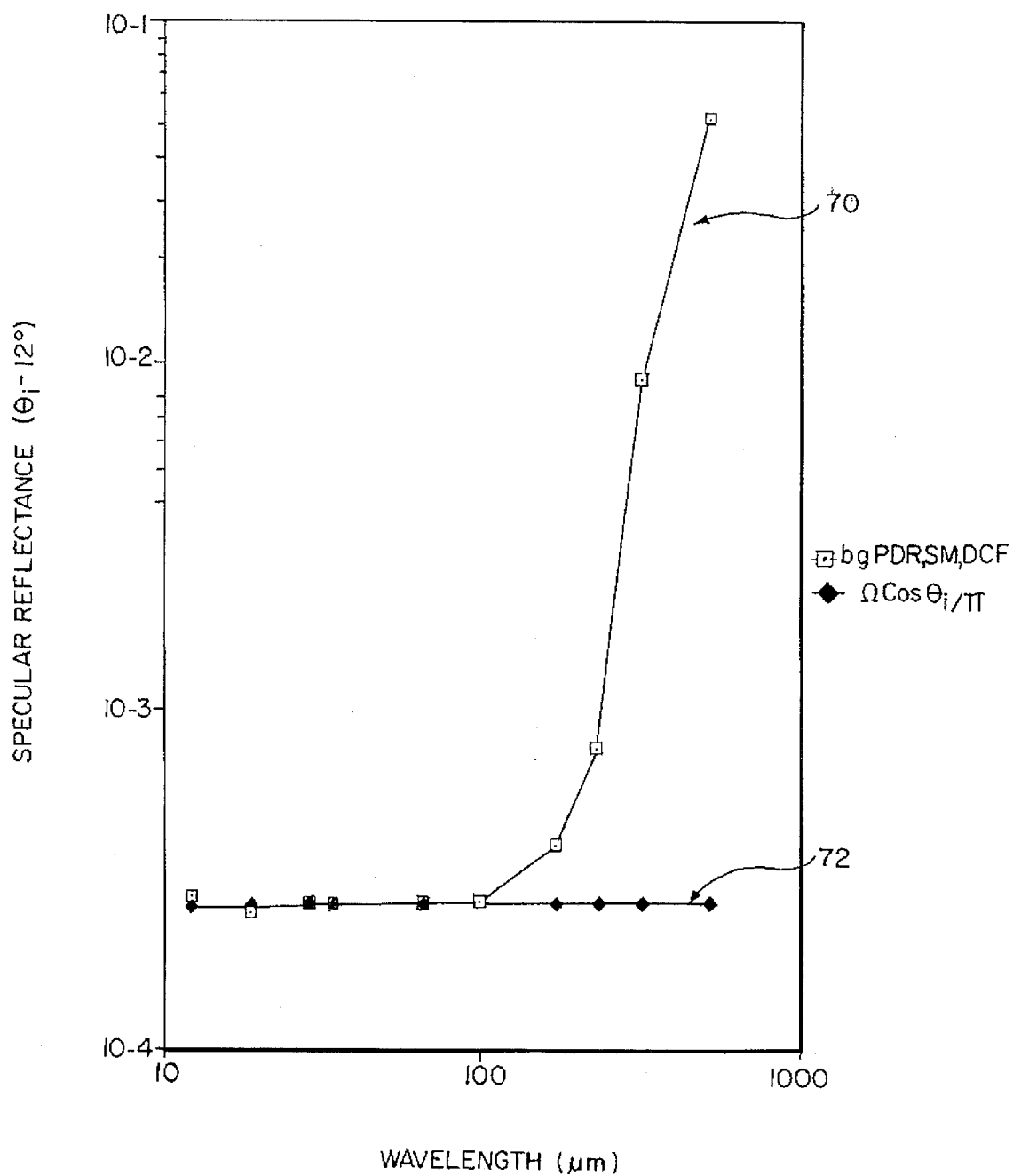
FIG. 3 is a graph of the specular reflectance of an exemplary embodiment of the invention versus wavelength.

Another exemplary reflector plate 16 produced the specular reflectance spectrum indicated by curve 70 in FIG. 3, wherein the specular reflectance of reflector 16 is compared with that of an isotropic perfect reflector, described earlier, and indicated by straight line 72. The r.m.s. roughness $\sigma$ of this exemplary reflector is 56 micrometers. In a specular reflectance spectrum, the reflectance is measured at many wavelengths but only at one angle, the specular angle (where the angle of incidence equals the angle of reflection). In this case an incidence angle of 12° was utilized. As seen in FIG. 3, the reflectance of plate 16 is independent of the value of the wavelength between 12 μm and 100 μm. As shown, the actual reflectance of curve 70 is the same as that of the isotropic perfect reflector indicated by line 72, up to 100 μm, and thus, reflector plate 16 behaves as an isotropic perfect reflector up to this value. Note that 100 μm is approximately equal to $2\sigma$, the upper limit for which the reflector will be perfectly isotropic, as mentioned earlier. Near a value of about 200 μm and beyond, the spectrum curve 70 climbs rapidly above the level of the isotropic perfect reflector 72. The rapid climb of curve 70 indicates that reflector plate 16 is no longer perfectly isotropic at these longer wavelengths. Although plate 16 is not perfectly isotropic at 200 μm, current theory indicates that its reflectance will still be largely diffuse even at wavelengths as long as $8\sigma$ (about 450 μm). This effect is partly demonstrated in FIG. 4.

FIG. 6 illustrates the diffuse, off-specular, reflectance of an embodiment of this invention in which the surface roughness is only 44 μm. The diffuse reflectance of a surface is measured by the bidirectional reflectance distribution function, or BRDF, described earlier in the Background section. In FIG. 4, BRDF is plotted with respect to $\Delta\beta$, which is the projection of the off-specular reflection angle. The BRDF of an isotropic perfect reflector is denoted by the horizontal dashed line 74 at the value $1/\pi \text{ sr}^{-1}$. The BRDF of this embodiment was measured by two different far-infrared detectors, the CARROUSEL and the ECLIPSE, at the incidence angle of 11°. The CARROUSEL detector measured the BRDF at wavelengths of 12 μm, 36 μm, and 65 μm as indicated on FIG. 4 by curves 76, 78, and 80, respectively. The ECLIPSE detector measured the BRDF at wavelengths of 50 μm, 100 μm, and 200 μm as indicated on the figure by curves 77, 79, and 81, respectively. Aside from the notable exception of curve 81, the generally horizontal orientation of these curves confirms the isotropic nature of the diffuse reflectance of reflector plate 16 of this 44 μm embodiment. The vertical separation of the sets of data obtained by the two detectors indicates the error in the absolute calibration of their response. If data were averaged together, the resultant mean value would be approximately equal to $1/\pi \text{ sr}^{-1}$ which is the value of an isotropic perfect reflector.

The notable exception, which is shown by curve 81, to the horizontal nature of curves 76, 77, 78, and 79 and 80, occurs at the wavelength of 200 μm. The spike or peak of curve 81 at Δβ=0 (which is the specular direction, where the spectrum of FIG. 3 was obtained) demonstrates how the isotropically diffuse reflectance changes when the wavelength becomes larger than average size of a surface facet. (The average size of a facet, 2σ, for this particular embodiment is about 90 μm). The peak at 200 μm in the specular direction occurs at the expense of the off-specular reflectance in order to conserve energy, because the aluminum material of plate 16 is a perfect reflector, as noted earlier. Thus the level of the off-specular reflectance drops, and it can be seen in FIG. 6 that the level of curve 81 for Δβ>0.2 is generally below curves 77 and 79 which were obtained by the same detector. However, this diffuse reflectance still extends to large off-specular angles, and current theory indicates that it will remain in some manner to wavelengths as large as 8 σ.

At the short (visible) wavelength of 0.63 μm, BRDFs made at incidence angles of 5° and 30° are also isotropic, demonstrating again the angular independence of the reflectance of this surface. However, in the visible wavelength region, the aluminum utilized in this embodiment of the invention is no longer a perfect reflector, and absorption by the alloy materials of 6061-T6 aluminum lowers the flat BRDF level to a value of 0.14 sr$^{-1}$, which is less than half that measured in the far-infrared. If pure aluminum (type 1100) is used instead of the absorbing alloy, this embodiment should be perfectly isotropic for wavelengths as short as 2 μm.

Thus, the lack of significant dependence of the reflectance on both direction (FIG. 4) and wavelength (FIG. 3) make the surface of this invention a very valuable optical standard at wavelengths between 5 μm and 100 μm. Within that wavelength range, scientists and engineers can rely upon reflectance measurements of this surface to produce a BRDF of 1/π sr$^{-1}$ regardless of the direction of reflection or the specific wavelength, and they can calibrate measurements of other materials and surfaces in terms of the reflectance by this invention. In practice, this is easily done by measuring the ratio of the reflectance of an unknown surface to that of the surface of the present invention and multiplying this ratio by 1/π, as indicated in the equation below.

$$\text{unknown BRDF } (\lambda, \Theta_s) = \frac{R(\lambda, \Theta_s) \text{ unknown}}{R \text{ invention}} \; 1/\pi \; sr^{-1}$$

Although the actual quantity being measured will be a voltage, these voltages are directly proportional to the reflectance of the surface, so the ratio is the same. At wavelengths both above and below the range of 5 μm to 100 μm, current theory indicates that this invention will still be a highly diffuse reflector, if not perfectly isotropic.

Because this invention reflects isotropically, it can be used to diffuse any narrow or otherwise collimated incident beam of radiation from the infrared to submillimeter wavelengths. Two particular applications where it is desirable to diffusely reflect an incident beam are on the interior surface of an integrating sphere and on the baffles of a high intensity beam dump.

A third application based on diffusing an incident infrared beam would result from replication of the surface roughness of this invention by a molding process onto one or both sides of a slab of polyethylene or other infrared transmitting material to produce a diffusely transmitting far-infrared window, quite analogous to the opalescent glass used at visible wavelengths and described earlier in the Background section.

A so-called "black-body" source of light has in theory a Lambertian (isotropic) emittance pattern. Because this invention is an isotropic reflector, it will also be an isotropic emitter when heated. Thus another advantageous application of this invention is as the emitting surface of a black-body source of radiation at infrared to submillimeter wavelengths.

Although the present invention has been described relative to specific exemplary embodiments thereof, it will be understood by those skilled in the art that variations and modifications can be effected in the exemplary embodiments without departing from the scope and spirit of the invention. An example of such a modification is the use of another reflective material in place of aluminum.

What is claimed is:

1. A diffuse reflector at infrared and far-infrared wavelengths comprising a substantially flat plate having a greatly roughened surface, said roughened surface comprising a plurality of randomly oriented, randomly spaced, uniformly distributed, irregularly sized facets formed by electric discharge machining, an average height of said facets being at least as large as a longest wavelength to be diffusely reflected without a specular peak, said average height of said facets being between 45 μm and 225 μm.

2. The diffuse reflector recited in claim 1 wherein said plate comprises a metal plate.

3. The diffuse reflector recited in claim 2 wherein said metal comprises aluminum.

4. The diffuse reflector recited in claim 2 wherein said metal comprises an aluminum alloy.

5. The diffuse reflector recited in claim 1 wherein said plate has a bidirectional reflectance distribution function approximately equal to 1/π sr$^{-1}$ for normally incident far-infrared radiation between the wavelengths of 5 μm and 100 μm.

6. A diffuse reflector at infrared and far-infrared wavelenghts comprising a substantially flat plate having a generally roughened surface, said roughened surface comprising a plurality of randomly oriented, randomly spaced, uniformly distributed, irregularly sized facets formed by electric discharge machining, an average height of said facets being at least as large as a longest wavelength to be diffusely reflected without a specular peak, wherein said roughened surface has an r.m.s. roughness of about 56 micrometers.

\* \* \* \* \*